United States Patent

[11] 3,584,444

[72] Inventors Ernest F. Sammann
Rte. 4, Box 73;
Walter W. Jackson, Rte. 4, box 102, both of
Dimmitt, Tex. 79027
[21] Appl. No. 820,478
[22] Filed Apr. 30, 1969
[45] Patented June 15, 1971

[54] STALK PICKUP APPARATUS FOR HARVESTERS
10 Claims, 4 Drawing Figs.
[52] U.S. Cl. ............................................................ 56/119
[51] Int. Cl. .............................................................. A01d 45/02
[50] Field of Search .............................................. 56/15, 16, 17, 18, 60, 61, 95, 98, 105, 106, 109, 110, 111, 119, 317, 502

[56] References Cited
UNITED STATES PATENTS

| | | | |
|---|---|---|---|
| 2,621,461 | 12/1952 | Tiedtke | 56/502 |
| 2,933,876 | 4/1960 | Davin | 56/119 |
| 2,949,717 | 8/1960 | Johannensen | 56/119 |
| 1,295,254 | 2/1919 | Baird | 56/110 |
| 3,173,236 | 3/1965 | Byrd | 56/119 |
| 3,331,196 | 7/1967 | Grant | 56/98 |
| 3,350,865 | 11/1967 | Ashton et al. | 56/119 |
| 3,423,910 | 1/1969 | Shimamoto et al. | 56/119 |

Primary Examiner—Antonio F. Guida
Attorney—Wayland D. Keith

ABSTRACT: A stalk pickup for a harvester for harvesting ear laden stalks of corn and the like which have fallen. The present stalk pickup is driven from a transverse horizontal shaft and provides for supporting, in cantilever relation, a plurality of conveyor chains having outstanding lugs thereon, with a chain immediately above the respective snouts of the harvester so that the ear bearing stalks will be picked up and engaged between the lower reach of the cantilever supported chain and the upper face of the snout so that the stalk will move upward at a slightly greater speed than the speed at which the harvester moves over the terrain, with the lower reach of each of the chains moving in the opposite direction to the movement of the harvester over the terrain. Spaced apart polygonal discs, having sharp pointed cutting blades on certain corners, are mounted on the horizontal shaft and rotatable therewith, which serve to cut stalks to prevent entanglement of the stalks with the machinery. Spiral conveyors are provided on each outer snout to direct the stalks upward and inward into the harvester.

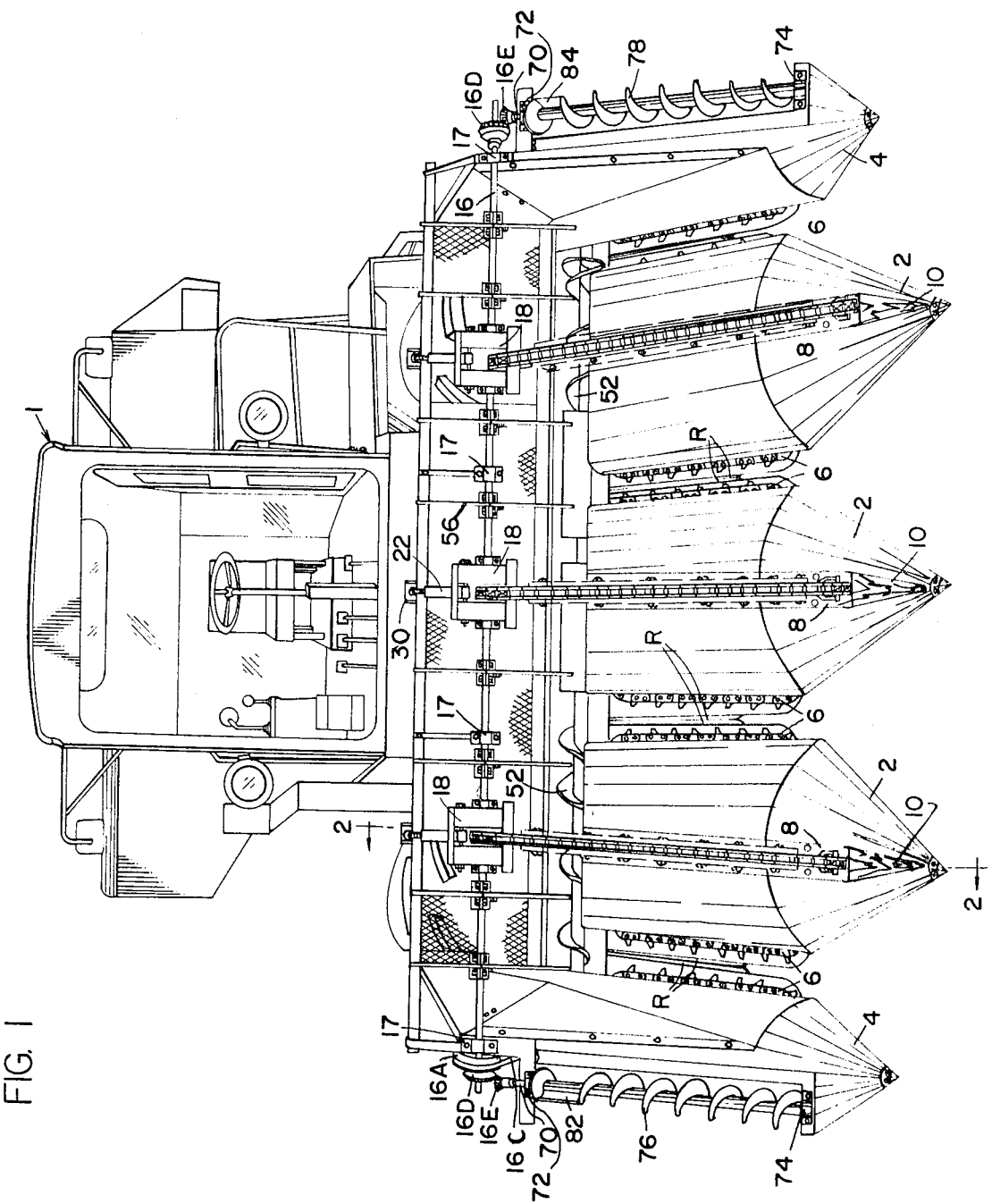
FIG. I
ERNEST F. SAMMANN
WALTER W. JACKSON
INVENTOR.
BY
Wayland D. Keith
HIS AGENT

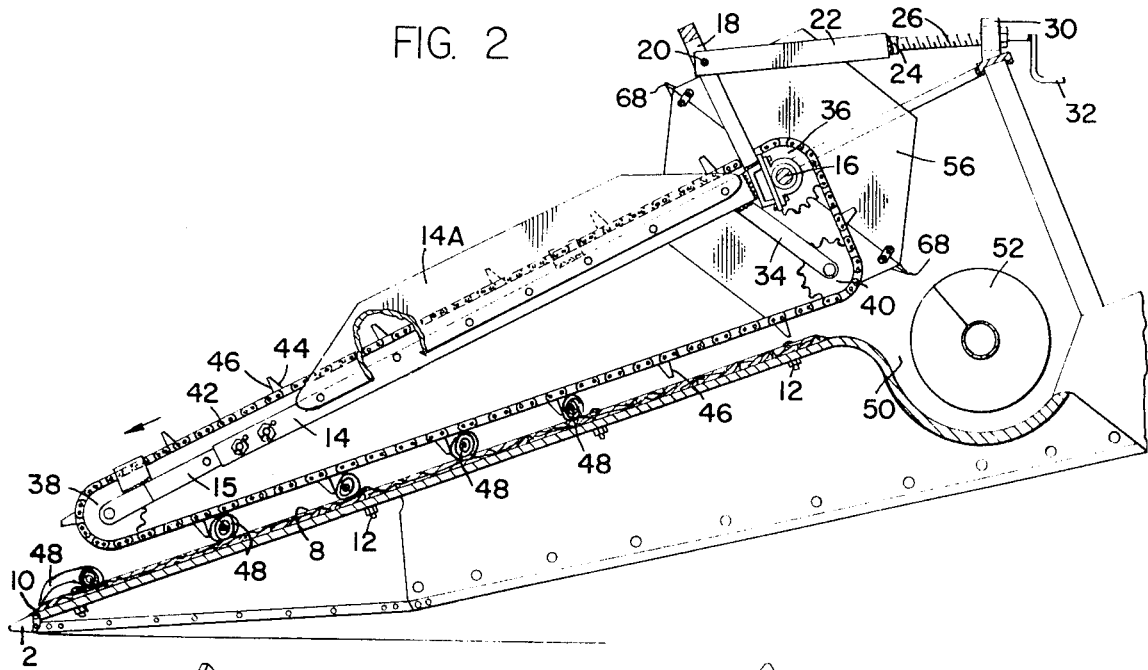
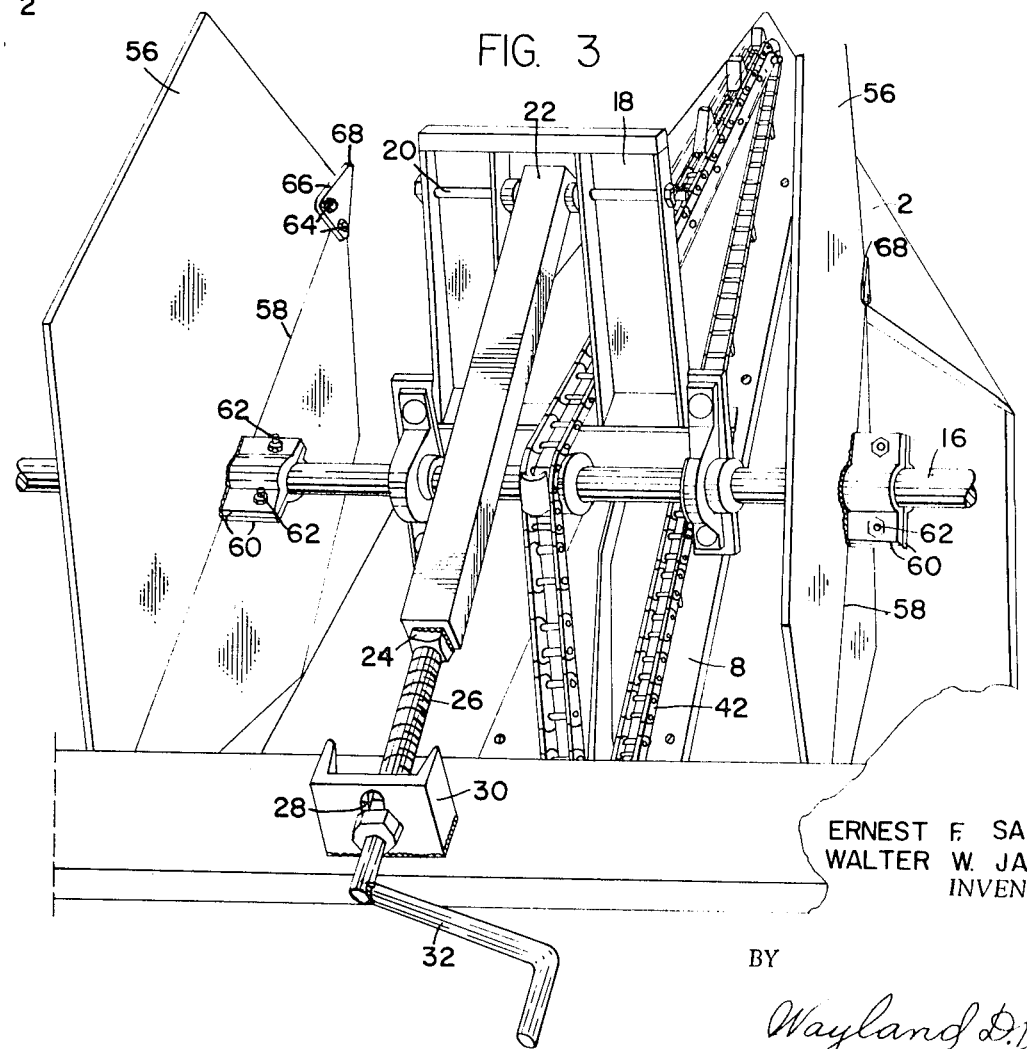

ERNEST F. SAMMANN
WALTER W. JACKSON
INVENTOR.

BY

Wayland D. Keith
HIS AGENT

STALK PICKUP APPARATUS FOR HARVESTERS

This invention relates to improvements in stalk pickup apparatus for harvesters and more particularly to stalk pickup for grain harvesters, such as corn and the like.

Various stalk pickup devices have been proposed heretofore, but these, for the most part, were for headed-type grains, such as milo maize, kafir corn, sorghum, however, the head of these stalks are at the top or near the top thereof and a chain or belt with upstanding projections thereon would lift the head end of the stalk sufficiently to enable the stalk to be passed through a cutting sickle, whereas, ear corn usually has the ears thereof approximately midway of the length of the cornstalk and when the upper portion of the stalk is elevated, the portion of the stalk on which the ears are located is not necessarily elevated.

It is desirable to lift cornstalks having ears thereon, so that the stalk and the ears thereon will be conveyed upward in a confined relation by the conveyor until the stalk is drawn between snapping rolls or is severed below the ear to direct the ear into the harvester. If the stalk should become broken between the ear and the ground, the ear or ears thereon are usually lost.

The present harvester for fallen stalks is so designed that it may be attached to various harvesters for harvesting corn and other crops which use corn snapping rolls or cutting sickles, with a minimum of alteration to the harvester.

An object of this invention is to provide a pickup apparatus for harvesters that will pick up fallen corn stalks and the like and move these upwardly along an incline of the snout in confined relation to enable the stalks of corn to be passed between snapping rolls or cut with a sickle and ears of corn directed into the thresher for threshing of the corn.

Another object of the invention is to provide a stalk pickup attachment for a corn harvester that will direct the corn up to corn snapping rolls or onto a sickle and thence into a conveyor, and wherein long and entangled stalks are severed to enable the ready handling of the stalks and ears of corn thereon into the corn harvester.

Still a further object of the invention is to provide a spiral auger pickup arrangement for lifting fallen stalks, with a kicker element being provided thereon to kick the ears of ear laden stalks inward toward the snapping rolls or sickle and thence onto the conveyor to enable the proper threshing and disposition of the threshed corn.

With these objects in mind, and others which will become manifest as the description proceeds, reference is to be had to the accompanying drawings, in which like reference characters designate like parts in the several views thereof, in which:

FIG. 1 is a front elevational, perspective view of a harvester, such as used for harvesting corn and the like, and showing the stalk pickup device mounted thereon;

FIG. 2 is an enlarged, longitudinal sectional view taken on line 2-2 of FIG. 1, looking in the direction indicated by the arrows;

Figure 4:
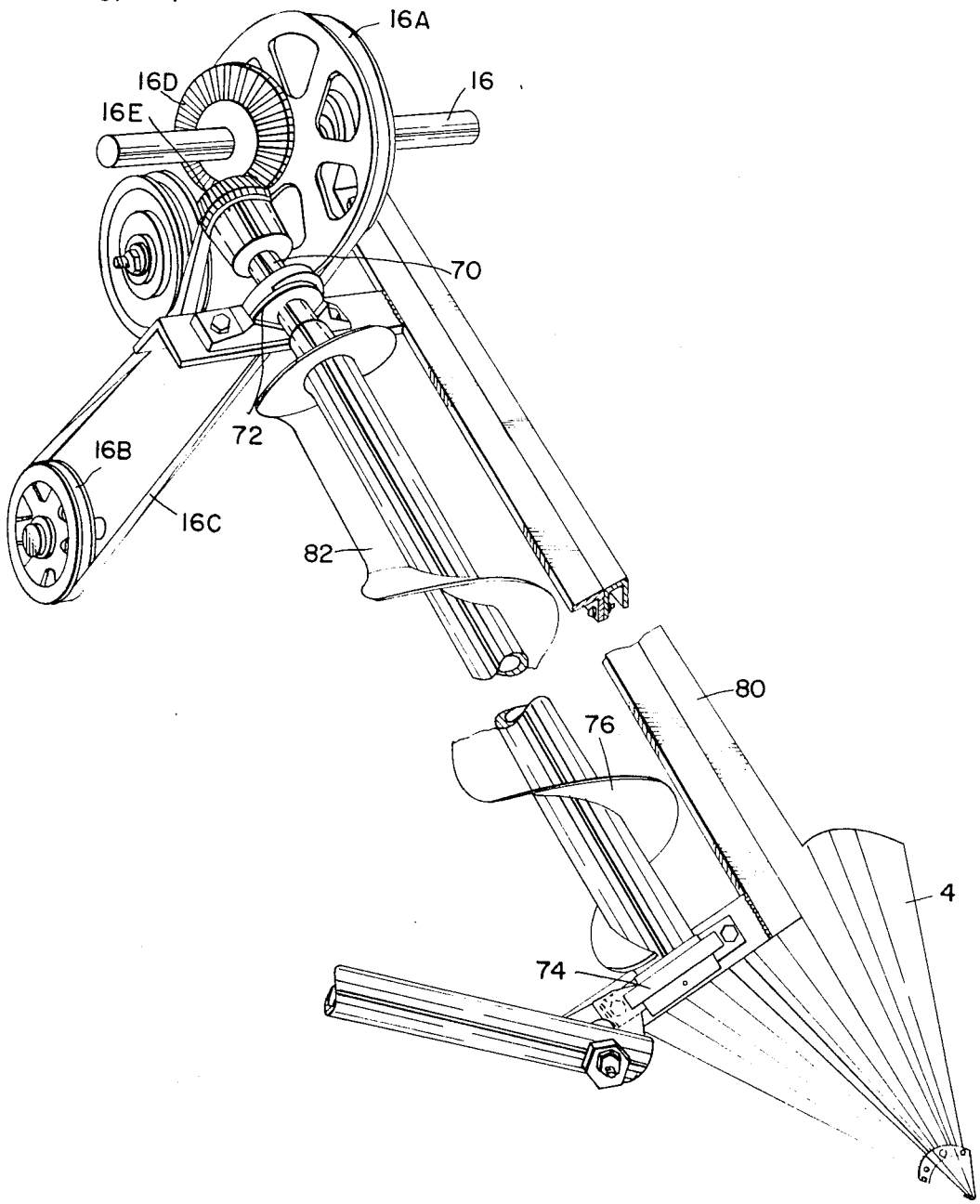

FIG. 3 is an enlarged, fragmentary, perspective view of a portion of the attachment for picking up fallen stalks and showing the mechanism associated therewith, including an adjusting device to raise and lower the conveyor with respect to the surface over which it operates; and FIG. 4 is a fragmentary, perspective view, with parts broken away and shown in section, of a spiral auger pickup conveyor mounted on each side of the harvester and showing a kicker element at the upper end of the spiral screw conveyor to move the ears of corn inward into the corn harvester.

With more detailed reference to the drawings, the numeral 1 designates generally a self-propelled harvester, such as used for harvesting corn. This harvester is of the character that generally uses snapping rolls R to draw the stalk therethrough to remove the ears therefrom and conveys the ears of corn thereinto and threshes the corn, and separates the threshed kernels from the stalks and other residual material and directs the threshed corn into a suitable bin.

The harvester has three forwardly extending snout portions 2 which passes downward between the four crop rows, with a snout portion 4 at each outer side of the outer rows so as to direct the stalks between conventional gathering chains 6 and snapping rolls R on each side of forwardly extending snouts 2 and on the inner side of snout 4.

Each of the snouts 2 has a strip of material 8 positioned medially along the upper surface of each forwardly extending snout 2, which material may be of wood, plastic or other suitable material to prevent wear on the upper surface of the respective snouts 2. It is preferable to have the lower ends 10 of strips 8 tapered so that the stalks will slide thereonto and therealong. The strips 8 are held in place by bolts 12.

A support frame 14 extends forwardly from transverse shaft 16 and is journaled thereon. The frame 14 is supported in cantilever relation a spaced distance above strips 8 by an upstanding U-shaped member or support means 18, which member has a pivot bolt 20 passing therethrough near the outer end thereof to pivotally attach a hollow linkage member 22. The hollow linkage member has a screw-threaded nut 24 weldably secured to the end thereof remote from pivot bolt 20 so as to threadably receive a screw 26, which screw has a crank 32 on the outer end thereof. The screw 26 is mounted in slot 28 in bracket 30, so as to hold the screw against longitudinal movement with respect to the bracket 30, when the crank 32 is turned. In this manner the cantilever frame may be raised and lowered, to secure the desired adjustment.

A support member 34 is secured to and extends downward from the end of each cantilever beam 14 adjacent shaft 16. A sprocket or transmission drive means 36 is fixedly secured on shaft 16 and rotates therewith. A sprocket or transmission idles means 38 is journaled near the distal end of each cantilever bean 14 and a sprocket 40 is journaled near the lower end of each support member 34, which sprockets lie in an upright plane to enable an endless conveyor chain or transmission means 42 to surround the sprockets 36, 38 and 40 in operative relation. Each cantilever beam 14 has an adjustable portion 15 thereon so as to compensate for wear of the endless conveyor chain 42.

Each cantilever beam 14 has plates 14A, one which plate is secured to each side thereof so as to shield the portion of the endless conveyor chains 42 from stalks, from a point near sprocket 36 to a point near the lower end thereof. It is preferable to have the ends of these plates tapered so that the corn, which is standing upright, will pass thereby without being engaged by outstanding lugs 44.

The shaft 16 is journaled in bearings 17 on the harvester 1 and is supported above the upper ends of snouts 2 and 4. A pulley 16A is mounted on one end of the shaft 16 and is connected in driving relation with a source of power, such as a drive pulley 16B, by an endless belt 16C.

The endless conveyor chain 42 has outstanding lugs 44 thereon, each of which lugs has a flattened face 46 on the lead side thereof, so the outer ends of the lugs 44 of chain 42 may be positioned a spaced distance above the upper face of strips 8 and to lie in a plane parallel thereto, so, as the chain moves in the direction indicated by the arrow, FIG. 2, stalks of corn or the like, such as indicated at 48, which are being lifted by the forward ends of the snouts 2 and 4 are moved upward onto the upper faces of strips 8 and pass between the respective strips and the lower side of the lower reach of the endless conveyor chain 42 and are confined between lugs 44, as indicated in FIG. 2.

With the stalks 48 confined between the endless conveyor chain 22 and the upper surface of strips of material 8, and with the chain 42 operating at a slightly greater lineal speed than the speed at which of the harvester moves across the terrain, the stalks 48 will be raised up and moved along the strips 8 and directed into a conveyor casing 50, in which a spiral conveyor 52, or other suitable type conveyor, is positioned, to convey ears of the ear laden stalks of corn into the inlet feed opening of the thresher mechanism (not shown).

Mounted on shaft 16 and rotatable therewith are polygonal discs 56, which are preferably formed of transversely separable halves, which halves are separated along a line 58, with a half-clamp member 60 welded to each half of each polygonal disc, with the clamp members being fitted together as shown in FIG. 3. When the half-clamp members are complementally fitted together around shaft 16, bolts 62 bindingly engage these clamp members 60 to shaft 16. It is preferable to have the polygonal discs 56 joined together at the periphery as by bolts 64 passing through clips 66, the outer point 68 of which clips serve as a stalk cutting blade, upon rotation of these polygonal discs. The stalks that gather on the upper ends of snouts 2 and 4 are cut so that the stalks and ears of corn will pass into the conveyor without clogging the mechanism.

The shaft 16 has a bevel gear 16D fixedly secured thereto and rotatable therewith to drive a companion bevel gear or pinion 16E which is mounted on and secured to each screw conveyor shaft 70. Each screw conveyor shaft 70 is mounted in bearings 72 and 74 at the top and lower end on the outer side of each of the snouts 4, so upon rotation of shafts 70, spiral screw conveyors 76 and 78, which have right and left screw convolutions, urge any fallen stalks upward along the inclined surfaces 80 of snouts 4 until the ear laden stalks of corn reach kickers 82 and 84 at the upper end of conveyors 76 and 78, which kickers will hurl the ears of corn inward on the gathering chains 6, while the corn stalks will pass between conventional snapping rolls R. The ears of corn will pass inward on gathering chains 6 into the conveyor 52 for threshing in the corn harvester in a manner well known in the art of corn harvesters.

While the present attachment has been described somewhat with the corn harvester using snapping rolls, it is to be pointed out that this is for a matter of illustration and that the present device operates equally as well with a harvester using a conventional sickle, whether gathering ear corn, milo maize, kafir corn, sorghum, or other upstanding grain crops which have grain on the stalk.

Having thus clearly shown and described the invention, what we claim as new and desire to be secured by Letters Patent is:

1. In a combination with a harvester, which harvester has forwardly extending snouts to engage fallen stalks, which snouts pass between crop rows to perform a harvesting operation;
   a. a transverse shaft mounted on the harvester and being connected in driven relation with a source of power,
   b. longitudinally spaced apart drive means mounted on said transverse shaft, which drive means lies in an upright plane which passes longitudinally through certain of said forwardly extending snouts intermediate the width thereof,
   c. support frames journaled on said transverse shaft of the harvester and extending approximately parallel to the upper side of certain of said forwardly extending snouts,
      1. adjustment means associated with each said support frame and with the harvester to support said support frames, in cantilever relation, throughout the length thereof, above the upper sides of certain of said forwardly extending snouts,
   d. a transmission idler means rotatably mounted on each said frame near the outer end thereof,
   e. an elongated, flexible, endless transmission means lying in the respective upright planes of said drive means and said transmission idler means and passing therearound and being in driven relation therewith and supported above certain of said snouts,
      1. the lower reach of each said elongated, flexible transmission means adapted to move in the opposite direction from the line of travel of said harvester the greater portion of the length of the snout with which each transmission means is associated,
   f. outwardly extending lugs on the exterior side of said elongated, flexible transmission means,
      1. certain of said forwardly extending snouts have an imperforate, longitudinal strip mounted thereon on the upper side thereof, which strips are positioned below the lower ends of said lugs on the lower reach of said elongated, flexible, transmission means, which strips extend the greater portion of the length of the respective snouts to present a slidable surface, and
      2. said lugs on the lower reach of the transmission means pass in close proximity to the upper face of the slidable surface of certain of said imperforate, longitudinal strips on certain of said upwardly extending snouts to bindingly engage stalks, of the crop being harvested, between the upper slidable surface of said imperforate, longitudinal strips and the endless transmission means to enable the stalks to slide upward, when said transmission means is moved relative to the imperforate, longitudinal strips.

2. In combination with a harvester, which harvester has forwardly extending snouts to engage fallen stalks, as defined in claim 1; wherein
   a. said elongated, spaced apart drive means, which are mounted on said transverse shaft, are sprockets,
   b. said transmission idler means, which are rotatably mounted on said frame near the outer end thereof, are sprockets, and
   c. said elongated flexible, endless transmission means, which surround each said drive means and each said idler means, is a chain.

3. In combination with a harvester, which harvester has forwardly extending snouts to engage fallen stalks, as defined in claim 2; wherein
   a. said support frame, mounted on the harvester, has a member secured thereto and extending downwardly therefrom,
   b. a sprocket mounted in journaled relation near the lower end of said downwardly extending member, and
   c. each said endless transmission chain, which passes around each said drive sprocket and each said idler sprocket on said support frame, passes around each said sprocket journaled near the lower end of each said downwardly extending member so as to maintain the lower reach of each said endless transmission chain substantially parallel to the upper face of certain of said snouts.

4. In combination with a harvester, which harvester has forwardly extending snouts to engage fallen stalks, as defined in claim 1; wherein
   a. an upstanding member is secured to said support frame adjacent said transverse shaft, and
   b. adjustment means is secured to said upstanding member near the distal end thereof and to the harvester to support said outwardly extending support frame in cantilever relation with respect to the upper surface of certain of the forwardly extending snouts.

5. In combination with a harvester, which harvester has forwardly extending snouts to engage fallen stalks, one end of which is rooted in the ground, as defined in claim 4; wherein
   a. an upstanding member is secured to said support frame adjacent said transverse shaft, and
   b. said adjustment means, connected to said upstanding member near the outer end thereof and to the harvester, includes a crank and screw mechanism to adjust the support frame to control the spacing between the lower ends of said lugs on the lower reach of said elongated, flexible, endless transmission means and the imperforate strips mounted on the upper face of certain of the forwardly extending snouts.

6. In combination with a harvester, which harvester has forwardly extending snouts to engage fallen stalks, as defined in claim 5; wherein
   a. said upstanding member, journaled on said transverse shaft, is a U-shaped member straddling said elongated, flexible, endless transmission means, and
      1. said adjustment means is connected with said U-shaped member near the outer end thereof.

7. In combination with a harvester, which harvester has forwardly extending snouts to engage fallen stalks, as defined in claim 1; wherein
 a. said imperforate, longitudinal strips are wood strips.

8. In combination with a harvester, which harvester has forwardly extending snouts to engage fallen stalks, as defined in claim 1; wherein
 a. said imperforate, longitudinal strips are plastic strips.

9. In combination with a harvester having at least one forwardly extending snout to perform a harvesting operation;
 a. A transverse shaft mounted on the harvester and being connected in driven relation with a source of power,
 b. drive means connected to said transverse shaft,
 c. a support frame mounted on the harvester and lying in an upright plane above the upper side of said forwardly extending snout, which plane passes longitudinally through said snout,
  1. a strip mounted on the upper face of certain of said snouts medially thereof and extending for a portion of the length thereof,
  2. means mounted on the harvester to support said support frame in said upright plane above the upper side of said forwardly extending snout,
 d. transmission idler means mounted on said support frame near the outer end thereof,
 e. an elongated, flexible, endless transmission means lying in said upright plane and surrounding said transmission drive means and said transmission idler means and being engaged therewith in operative relation,
  1. the lower reach of said elongated, flexible, endless transmission means being adapted to move along said strip on the upper face of said forwardly extending snout in the opposite direction from the line of travel of the harvester, and
 f. outwardly extending lugs on the exterior side of said elongated, flexible, endless transmission means, which are adapted to bindingly engage the stalks and the like being harvested with the upper surface of said strip when said transmission drive means is moved longitudinally with respect to said strip mounted on said forwardly extending snout.

10. In combination with a harvester, which harvester has forwardly extending snouts to engage fallen stalks, which snouts pass between crop rows to perform a harvesting operation;
 a. a transverse shaft mounted on the harvester and being connected in driven relation with a source of power,
 b. opposed, angulated spiral conveyors mounted on the outer side of the respective outer-most snouts of the harvester and extending therealong in close proximity with respect thereto,
  1. an axial shaft associated with each said angulated, spiral conveyor,
 c. bearings journaling said shafts of said angulated, spiral conveyors near each end thereof,
 d. an elongated web near the upper end of each angulated, spiral conveyor to form a kicker to direct stalks and grain inward, upon rotation of said angulated spiral conveyors,
 e. drive means associated with the upper ends of said conveyor shafts and with said transverse shaft, for rotating said angulated spiral conveyors,
 f. longitudinally spaced apart drive means mounted on said transverse shaft, which drive means lie in an upright plane which passes longitudinally through certain of the forwardly extending snouts intermediate the width thereof,
 g. support frames journaled on said transverse shaft of the harvester and extending approximately parallel to the upper side of certain of said forwardly extending snouts,
  1. adjustment means associated with each said support frame and with the harvester, to support said support frames above the upper sides of certain of the forwardly extending snouts,
 h. a transmission idler means rotatably mounted on each said frame near the outer end thereof,
 i. an elongated, flexible, endless transmission means lying in the respective upright planes of said drive means and said transmission idler means, and passing therearound and being in driven relation therewith and supported above certain of the snouts,
  1. the lower reach of said elongated, flexible transmission means being movable in the opposite direction from the line of travel of the harvester the greater portion of the length of the snout with which each transmission means is associated, and
 j. outwardly extending lugs on the exterior side of said elongated, flexible transmission means, which lugs, on the lower reach of the transmission means, pass in close proximity to the upper face of certain of the forwardly extending snouts, to bindingly engage the stalks of the crop being harvested between the upper face of the snout and the endless transmission means to move the stalks upward, when said transmission means is moved relative to the respective snouts.